Sept. 5, 1950     R. L. SMYTHE ET AL     2,521,189
VISE HAVING ADJUSTABLE STRAP FOR
CLAMPING SOFT TUBULAR CONDUITS
Filed June 6, 1947     2 Sheets-Sheet 1
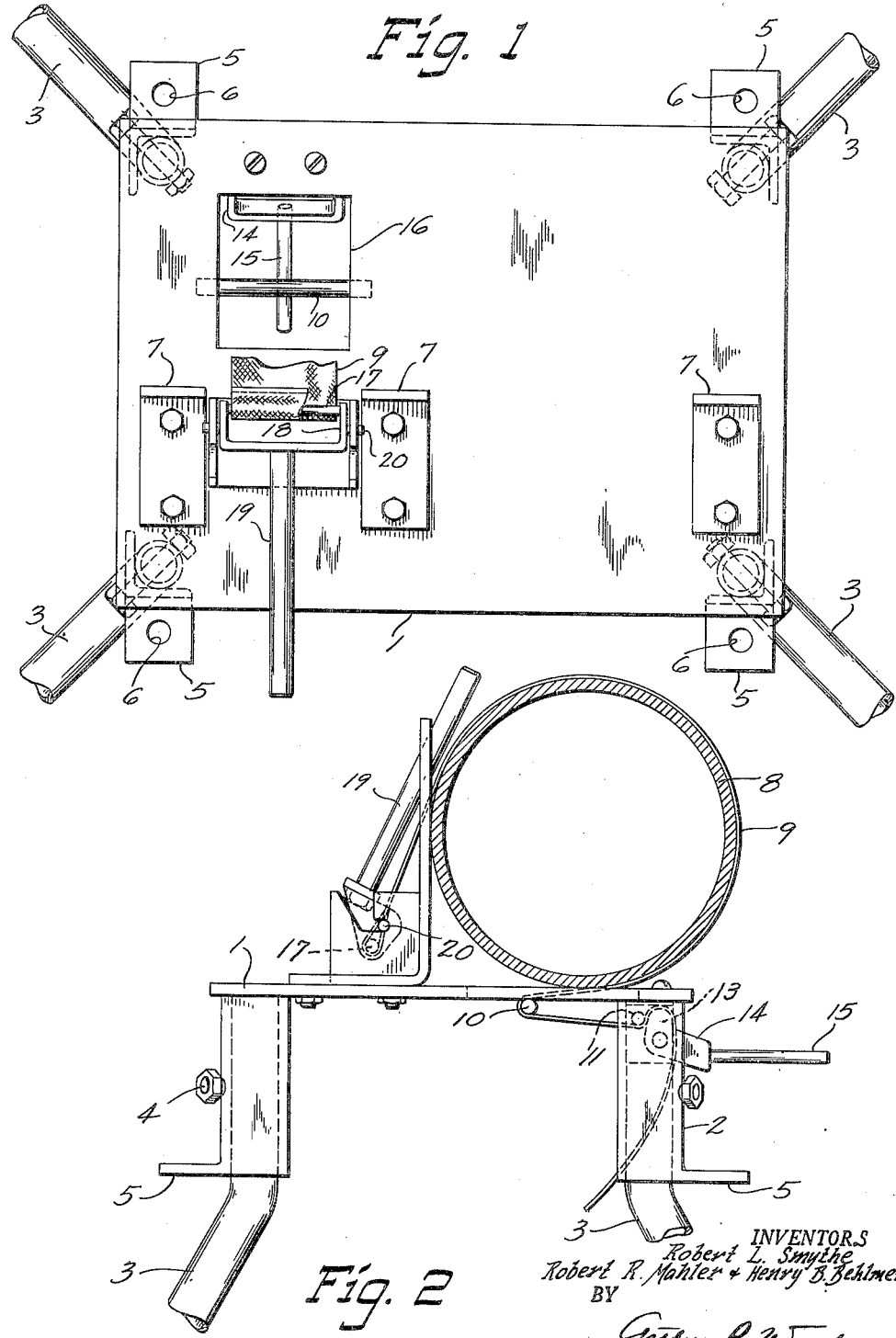
INVENTORS
Robert L. Smythe
Robert R. Mahler & Henry B. Behlmer
BY
Arthur R. Woolfolk
Attorney Sept. 5, 1950 R. L. SMYTHE ET AL 2,521,189
VISE HAVING ADJUSTABLE STRAP FOR
CLAMPING SOFT TUBULAR CONDUITS
Filed June 6, 1947 2 Sheets-Sheet 2
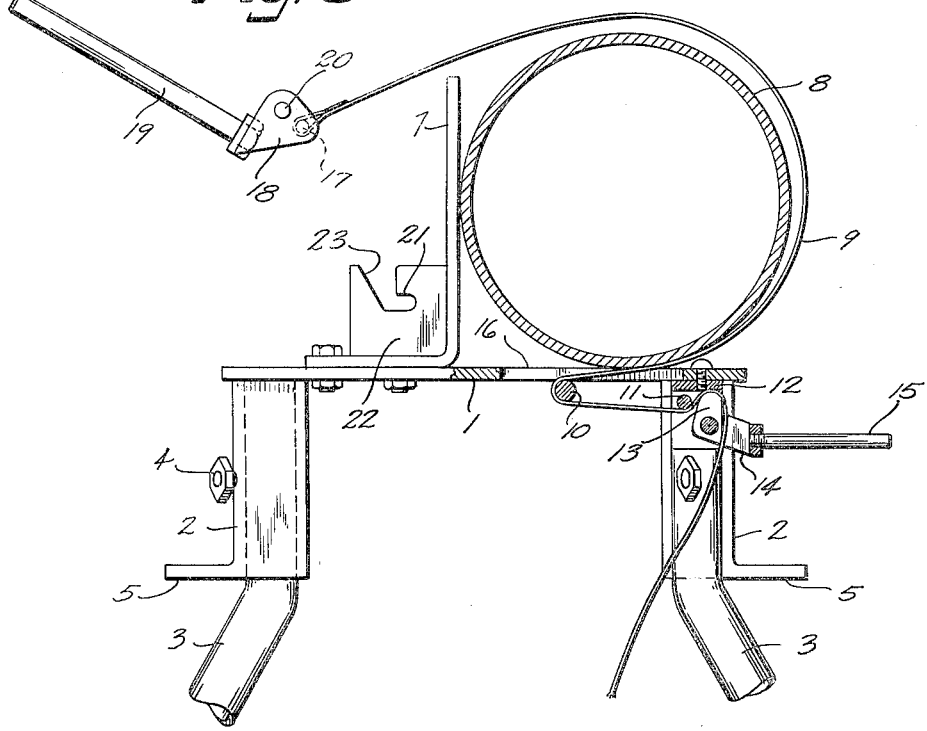
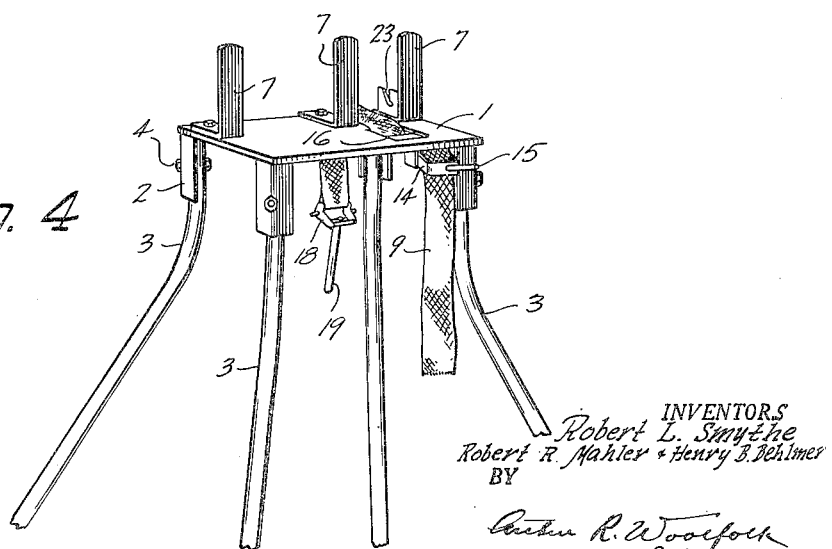
INVENTORS
Robert L. Smythe
Robert R. Mahler & Henry B. Dehlmer
BY
Arthur R. Woolfolk
Attorney Patented Sept. 5, 1950

2,521,189

UNITED STATES PATENT OFFICE 2,521,189

VISE HAVING ADJUSTABLE STRAP FOR CLAMPING SOFT TUBULAR CONDUITS

Robert L. Smythe and Robert R. Mahler, Milwaukee, and Henry B. Behlmer, South Milwaukee, Wis., assignors to McGraw Electric Company, a corporation of Delaware Application June 6, 1947, Serial No. 753,124

2 Claims. (Cl. 81—19)

This invention relates to a holding device for tubular members and is particularly directed to a device for holding fiber conduits or similar tubular members.

In cutting and tapering fiber conduits considerable difficulty has been experienced in securing, on the one hand, a firm hold on the conduit so that the operations may be performed on it, and on the other hand avoiding damage to the relatively soft conduit.

This invention is designed to provide a holding device which, though primarily intended to hold fiber conduits, nevertheless is applicable to holding other relatively soft tubular members, and objects of this invention are to provide a simple and reliable type of holding device which will not damage the relatively soft conduit but which will hold it with a very firm grip both against turning motion and against motion of translation so that the operator may freely perform the needed operation on the conduit with the assurance that no damage will result to it due to the holding means.

In greater detail, objects of this invention are to provide a conduit holding device which employs a relatively wide strip of canvas or similar material which substantially completely encircles and holds it against rotation without requiring a very high pressure per unit area on the conduit, and which is provided with means coacting with the wide band which prevents lateral shifting or, in other words, prevents motion of translation.

Further objects are to provide a conduit holding device which may be adjusted to take practically any size of conduit from a relatively small size to a relatively large size and which when so adjusted may be quickly and easily manipulated to clamp the conduit and to release the conduit in a very easy manner so that after it has once been adjusted for a given size, different conduits of that size may be substantially instantly locked in place or released from the device.

An embodiment of the invention is shown in the accompanying drawings, in which—

Figure 1 is a plan view of the device with parts broken away.

Figure 2 is an end elevation partly broken away showing a conduit in section and clamped in place.

Figure 3 is a view corresponding to Figure 2 showing the manner of releasing the conduit.

Figure 4 is a perspective view of the device without any conduit in place, and showing a modification of the leg sockets by omitting the bench attaching flanges shown in the preceding views.

Referring to the drawings, it will be seen that the device comprises a table-like member having a top portion 1 and having downwardly projecting relatively short tubular legs 2. These tubular legs or members are arranged to removably receive detachable legs 3 which may be held in place in any suitable manner as by means of bolts 4. It is to be noted further that the tubular or socket members 2 may have the legs 3 removed therefrom and may be bolted to a bench or other suitable support if desired. This is accomplished by providing outwardly projecting flanges or legs 5 (see Figures 1–3) which are apertured as indicated at 6 to receive lag screws, whereby the device may be attached to a bench.

The table top has three upwardly projecting rigid ears 7 whose faces are in alignment and against whose faces the conduit 8 is adapted to bear. A relatively wide canvas or other similar type of strap 9 is passed around the conduit and is adjusted to the desired size and tightened or released in a quick and easy manner as will be described hereinbelow. One end of the strap is passed over a guide bar 10 beneath the table and extends outwardly below a second guide bar 11 and is arranged to be clamped in place against the under side of a bearing plate 12 by means of a cam member 13. This cam member 13 is rigid with a yoke-like member 14 provided with a manipulating or rocking handle 15.

The table top is apertured as indicated at 16 and the strap 9 extends forwardly and upwardly through this aperture and passes around the conduit 8. Its inner end is looped around a bar 17 which extends transversely between the arms of a yoke-like member 18. This yoke-like member is provided with a locking or clamping handle 19 and with a pair of outwardly projecting trunnions 20. These trunnions 20 are adapted to fit within horizontally extending slots 21 formed in upstanding plates or ears 22 secured to the table top 1. The slots 21 are closed at one end, and at an opposite end open into a widened or outwardly flaring aperture 23 so that the trunnions 20 may be readily guided downwardly through the apertures 23 into the slots 21. Thereafter the handle or locking member 19 is rocked upwardly to the position shown in Figure 2. At this time it will be seen that the strap passes over dead center and is slightly to the left of the trunnions 20, as viewed in Figure 2, thus positively locking the clamping member 18, 19 against releasing motion. At the same time the conduit is held securely against the table top and against the aligned ears 7. It will be noted that the strap 9 encircles the major portion of the conduit 8 and consequently secures a very firm grip on the conduit though the pressure per unit area may be relatively small and far below that which would damage the fiber conduit.

It will be seen also that after the initial adjustment is secured by manipulating the handle 15 and adjusting the outer end of the strap 9 for a given size of conduit, that the successive lengths of conduits of that size may be substantially instantly clamped in place by merely putting the strap over them and positioning the trunnions in the slots 21 and thereafter rocking the handle 19 of the clamping member upwardly to the position shown in Figure 2. Obviously it is a very simple matter to release the conduit as the operator merely rocks the handle 19 downwardly and then lifts it forwardly and over the conduit.

The guide rod 10 is spaced inwardly a considerable distance so as to accommodate conduits of relatively small size as well as conduits of large size.

It will be seen that this invention provides a holding device for securely holding conduits of any desired size without damage to the conduit. It is to be noted also that lateral shifting or motion of translation of the conduit is prevented as the pull of the strap is generally downwardly at approximately 45°, thus holding the conduit securely against the table top and against the relatively wide aligned ears 7.

It will be seen that the device is suitable for field operation as the detachable legs 3 may be positioned and bolted in place and is equally applicable for a permanent or semi-permanent installation as the legs may be removed and the device may be bolted to a bench top.

Although this invention is primarily directed to holding means for fiber conduit, it nevertheless can be used for holding any other relatively easily damaged tubular member. Therefore, the expression "conduit" is to be interpreted broadly and not limited to the specific fiber conduit hereinabove referred to.

Although this invention has been described in considerable detail, it is to be understood that such description is intended as illustrative rather than limiting, as the invention may be variously embodied and is to be interpreted as claimed.

We claim:

1. A conduit holding device comprising a table top having an opening therethrough and having uprights provided with flat aligned faces, said uprights being spaced apart and arranged to form stops for a conduit when placed on said table top, a strap extending upwardly from below the table top through said opening and arranged to substantially encircle the conduit, a guide rod mounted below the table around which said strap passes, said guide rod being arranged relatively close to said uprights, clamping means carried on the under side of said table top for adjustably securing said strap, hook-like members carried by said table top and located on the upper side thereof, and tightening means secured to the end of said strap and detachably interlocking with said hook-like members and being rockable to tighten said strap.

2. A conduit holding device comprising a table top having an opening therethrough and having uprights provided with flat aligned faces, said uprights being spaced apart and arranged to form stops for a conduit when placed on said table top, a strap extending upwardly from below the table top through said opening and arranged to substantially encircle the conduit, a guide rod mounted below the table around which said strap passes, said guide rod being arranged relatively close to said uprights, clamping means carried by said table top for adjustably securing said strap near one end of said strap, hook-like members carried by said table top, and a yoke-like member provided with a transverse bar secured to the other end of said strap and having trunnions spaced from said bar and detachably interlockable with said hook-like members, said yoke-like member being arranged to be rotated to carry the end of said strap past dead center with reference to said trunnions to thereby tighten said strap and lock the strap in tightened condition.

ROBERT L. SMYTHE.
ROBERT R. MAHLER.
HENRY B. BEHLMER.

REFERENCES CITED

The following references are of record in the file of this patent:

UNITED STATES PATENTS

| Number | Name | Date |
|---|---|---|
| 1,026,036 | Hewitt | May 14, 1912 |
| 1,644,755 | Stephenson | Oct. 11, 1927 |

FOREIGN PATENTS

| Number | Country | Date |
|---|---|---|
| 296,588 | Great Britain | Sept. 6, 1928 |
| 546,103 | Great Britain | June 26, 1942 |